United States Patent [19]
Sinn et al.

[11] Patent Number: 5,902,089
[45] Date of Patent: May 11, 1999

[54] POULTRY LOADING APPARATUS

[76] Inventors: Steven C. Sinn, 23972 Feather Rd., Tremont, Ill. 61568; John D. Wilham, 420 Highview Rd., East Peoria, Ill. 61611; James D. Wilham, 544 Aspen Hall Dr., Harrodsburg, Ky. 40330; Richard Bloome, 1012 Marshall St., Carlinville, Ill. 62626

[21] Appl. No.: 08/804,359

[22] Filed: Feb. 21, 1997

[51] Int. Cl.⁶ .................................................. B65G 67/08
[52] U.S. Cl. ...................... 414/398; 414/346; 198/313; 198/812
[58] Field of Search .................... 414/346, 350, 414/351, 353, 398, 503, 504, 505, 523, 528, 340; 198/313, 632, 812

[56] References Cited

U.S. PATENT DOCUMENTS

| | | | |
|---|---|---|---|
| 2,834,487 | 5/1958 | Gaddis | 414/523 |
| 3,066,817 | 12/1962 | Bradshaw et al. | 414/505 |
| 3,253,577 | 5/1966 | Lund | 119/82 |
| 3,272,182 | 9/1966 | Lund | 119/82 |
| 3,292,965 | 12/1966 | Powers | 296/12 |
| 3,420,211 | 1/1969 | Hartvickson . | |
| 3,452,718 | 7/1969 | Wright . | |
| 3,476,089 | 11/1969 | Jerome | 119/82 |
| 3,524,558 | 8/1970 | Mastracci et al. | 214/38 |
| 3,548,895 | 12/1970 | Gentry, Jr. | 143/46 |
| 3,706,300 | 12/1972 | Wessinger | 119/82 |
| 3,722,477 | 3/1973 | Weldy et al. | 119/82 |
| 3,825,107 | 7/1974 | Cary et al. | 414/523 X |
| 3,826,353 | 7/1974 | Greasley | 198/139 |
| 3,916,835 | 11/1975 | Reynolds | 119/12 |
| 3,942,476 | 3/1976 | Napier | 119/82 |
| 3,945,484 | 3/1976 | Oury | 198/139 |
| 4,151,906 | 5/1979 | Pfeiffer et al. | 198/421 |
| 4,210,237 | 7/1980 | Gram | 198/425 |
| 4,303,258 | 12/1981 | Davis | 280/403 |
| 4,365,591 | 12/1982 | Wills et al. | 119/82 |
| 4,380,969 | 4/1983 | Thomas . | |
| 4,499,856 | 2/1985 | Hecht et al. | 119/82 |
| 4,600,351 | 7/1986 | Nelson . | |
| 4,780,041 | 10/1988 | Ashby et al. | 414/398 |
| 4,878,799 | 11/1989 | Seto et al. . | |
| 4,923,359 | 5/1990 | Petri et al. | 414/523 |
| 5,060,596 | 10/1991 | Esbroeck . | |
| 5,067,867 | 11/1991 | Ruder et al. | 414/398 X |
| 5,078,259 | 1/1992 | Honsberg | 198/419 |
| 5,195,687 | 3/1993 | Derichs et al. . | |
| 5,256,021 | 10/1993 | Wolf et al. | 414/398 X |
| 5,288,201 | 2/1994 | Pippin . | |
| 5,307,917 | 5/1994 | Hall | 198/313 |
| 5,322,154 | 6/1994 | Lenherr | 198/460 |
| 5,351,809 | 10/1994 | Gilmore et al. | 198/812 |
| 5,360,097 | 11/1994 | Hibbs | 414/346 X |
| 5,470,194 | 11/1995 | Zegers | 414/786 |
| 5,637,183 | 6/1997 | Borner | 156/547 |
| 5,642,803 | 7/1997 | Tanaka | 414/398 X |
| 5,660,147 | 8/1997 | Wills et al. | 119/846 |
| 5,685,416 | 11/1997 | Bonnet | 414/398 X |

FOREIGN PATENT DOCUMENTS 1020280  5/1983  U.S.S.R. ................ 414/503

*Primary Examiner*—James W. Keenan
*Attorney, Agent, or Firm*—Lockwood, Alex, Fitzgibbon & Cummings

[57] ABSTRACT

A poultry loading apparatus for transporting poultry from a confinement area such as a poultry house to a transport vehicle to allow transport of poultry from farm-to-farm or from farm-to-processing plant. The mobile poultry loading apparatus includes a conveyor system whereby poultry ride from a confinement area to the transport vehicle during loading. The conveying system includes a telescoping end that extends into and retracts from a coop during the loading process. A system of hydraulics controls the speed of the conveyor, aids in the transverse leveling of the machine, adjusts both the angle and tier of loading, and levels and controls the telescoping end of the conveyor.

15 Claims, 6 Drawing Sheets

POULTRY LOADING APPARATUS

BACKGROUND OF THE INVENTION

The present invention relates generally to a system for handling poultry and more particularly to a means, device or apparatus to effect the efficient handling of live poultry in the loading of the same at a farm site for transport therefrom.

Historically, poultry farming was carried out by raising poultry in houses on farm sites until such poultry was ready for delivery either at a particular time in its life, or during a particular season. The poultry was then caught, loaded, and transported to a final destination.

The poultry was customarily gathered manually at the houses, boxed or crated with numerous birds per crate, manually loaded aboard an open truck or van, and transported. The problems created by such a procedure are both numerous and significant. The manual handling of the poultry not only creates a materially high cost involved in raising the poultry and preparing them for market, but it also creates certain physical dangers to both the poultry as well as the personnel.

During hand catching and subsequent handling of poultry, some birds are bruised, injured, or even killed due to violent reaction from the birds or unintentional rough handling. Additionally, fowl inevitably beat their wings in an effort to escape upon capture, frequently resulting in a bird striking the handler with sufficient force to cause physical injury.

In light of the preceding problems, there has been an effort in the art to develop a method of loading poultry for transport with a minimal amount of manual labor. For example, U.S. Pat. No. 3,7060,300, issued Dec. 19, 1972 describes a system for handling poultry and transferring the same from poultry house to processing plant or purchases. This is accomplished by a process in which suction is applied to the poultry in the house to urge the poultry into a conveying conduit where air pressure is subsequently applied for forcing the poultry along the conduit and into a suitable bin. Air pressure is again used to urge the poultry out of the bin and into the processing plant. Although this system utilizing air pressure does solve some of the problems associated with that of manual labor, it does not solve all of the problems and even creates a few new ones. Air pressure tends to force the poultry through the loading system, and does not allow for a smooth and even flow. This constant forcing inevitably damages the poultry in some way, including broken legs and/or wings, which results in an adverse affect on their grading when dressed, and consequently a loss of revenue to the producer.

Another attempt to solve the problems associated with loading poultry on a transport vehicle was disclosed in U.S. Pat. No. 3,916,835, issued Nov. 4, 1975. This patent describes a complete conveying system that utilizes conveyors on the poultry transport vehicle that may be operated in conjunction with other external conveyors to effect embarkation and debarkation of the transport. If external conveyors are desired, this disclosure provides for an elevator and coupling assembly for coupling an external conveyor unit at selective heights to the various tiers of the poultry conveying transport apparatus.

Although manpower and its associated high costs are reduced with the use of such a conveying system, problems still remain. This patent discloses the combination of a main conveying apparatus, external conveyors and an elevator and coupling assembly. This assembly is integral to the main apparatus, and the changing of tier positions during loading and unloading cannot be accomplished solely by the external conveyors. Additionally, manual labor is still needed to load and unload the bottom of the external conveyors. Still another problem with this external conveyor is the steep angle at which the poultry are handled, causing the poultry to become uneasy, and "Roll Back" to occur.

In view of the afore-mentioned needs and the shortcomings of the prior art, it is therefore an object of the present invention to provide an apparatus that overcomes the deficiencies of the current practices whereby an apparatus and system is provided for loading poultry for transport with a minimum amount of labor and with maximum efficiency at a minimum cost.

It is another object of the present invention to provide a poultry loading apparatus whereby the manual and perhaps rough handling of the poultry is eliminated thereby eliminated damage sustained by laborers and minimizing any damages sustained to the poultry.

Still another object of the present invention is to provide a mobile poultry loading apparatus that can be shared among poultry houses, farms, or even town due to its adaptability to all trailers.

Still another object of the present invention to provide a self-cleaning and disinfecting poultry loading apparatus.

It is yet another object of the present invention to provide a user friendly poultry loading apparatus that may be operated effectively by a single person.

These and other objects, features and advantages of the present invention will be clearly understood through a consideration of the following detailed description.

SUMMARY OF THE INVENTION

According to the present invention, there is provided a poultry loading/unloading apparatus having a base and a sectional mainframe defining a transport conveyance system. A section of the mainframe is pivotably attached to another section which is then pivotably attached to the base. The apparatus has a control system for its overall leveling and pivotal height adjustments, as well as the extending/retracting capabilities of its conveyance.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
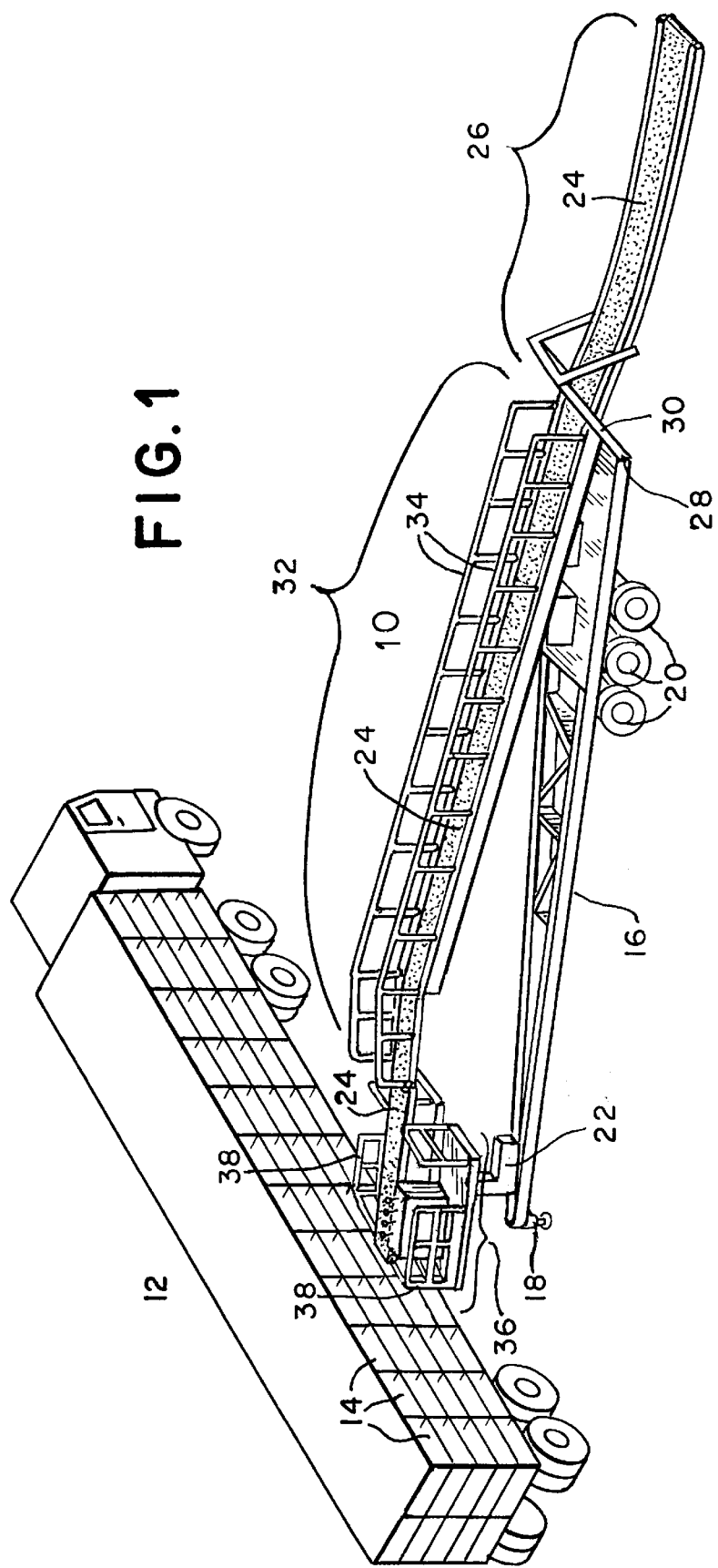
FIG. 1 is a perspective view of a transport vehicle along side the poultry loading apparatus constructed in accordance with the present invention.

FIG. 1 illustrates a poultry loading/unloading apparatus 10 constructed in accordance with the principles of the present invention. The apparatus 10 is shown in its operable state along side a transport vehicle 12 having numerous rows of poultry coops 14. The apparatus 10 may be integral with a trailer 16 which includes a hitch 18 with size adaptation, and wheels 20. Although the apparatus 10 is more efficient when used with trailer 16, the apparatus 10 is able to address all existing fleet of coop trailers. The trailer 16 further includes an elbow portion 22 (better shown in FIG. 2) to aid the apparatus 10 into its transport position.

In the present embodiment, the apparatus 10 utilizes a single conveyor belt 24 along its entire track. Presently the apparatus 10 is composed of three sections. The first section is the preloader 26 section at which the poultry begin their trek. The preloader 26 operates near the ground as depicted in FIG. 1, but its gooseneck portion 28 and support members 30 allow it to pivot and lay upon the mainframe 32 of the apparatus 10 during transport.

The mainframe 32 is positioned above the trailer 16 and may include protective sides 34 or even a cover. At the end of the mainframe 32 opposite the preloader 26 is the telescoping 36 section of the apparatus 10. FIG. 1 shows an operator platform 38 on either side of the telescope end 36 of the apparatus 10. An operator positioned upon this platform 38 has the capability to control all functions of the entire apparatus 10.

Figure 2:
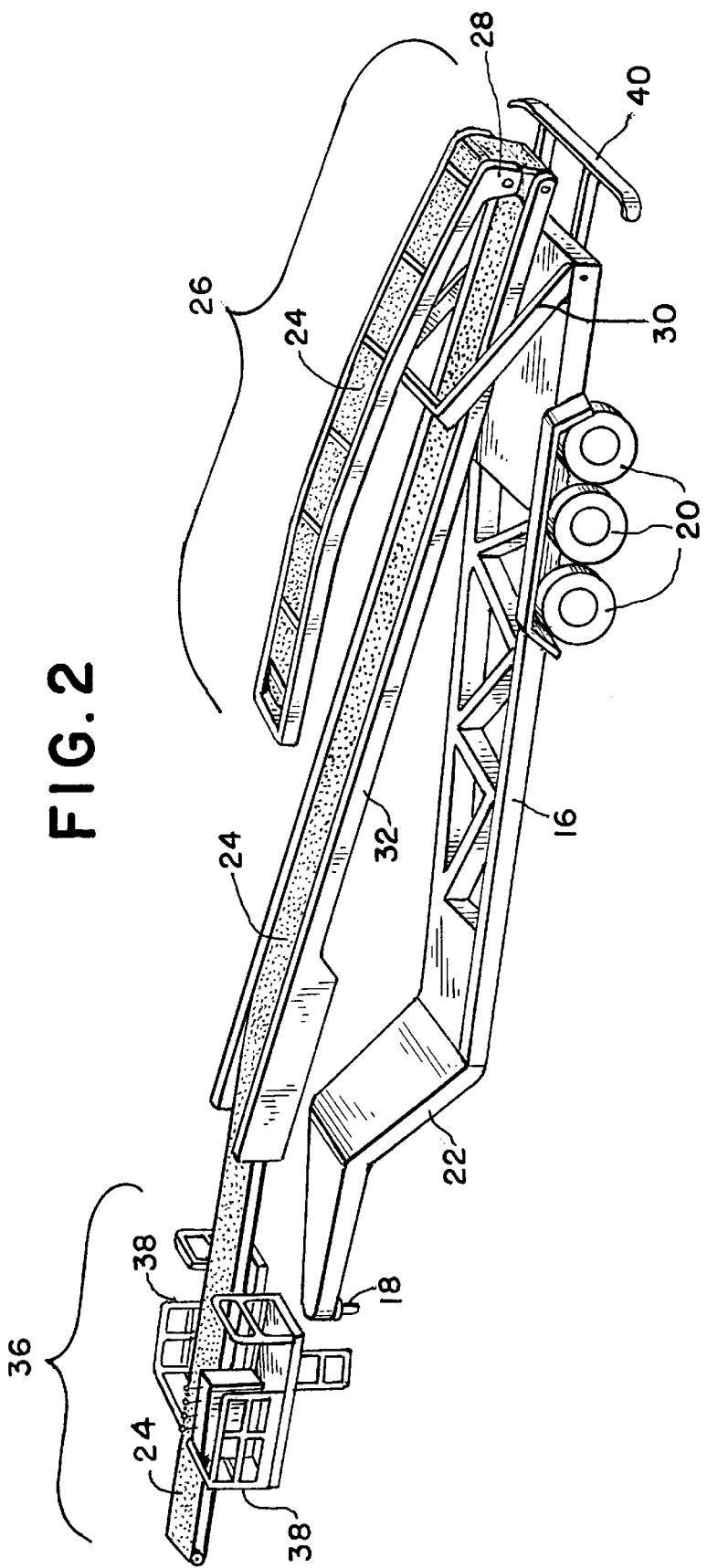
FIG. 2 is a perspective view of the poultry loading apparatus of FIG. 1 in the transport position.

One of the advantages of the poultry loading apparatus 10 of the present design is its mobile capability. FIG. 2 illustrates the ease with which such a design is compacted to allow the apparatus 10 to shorten and be legally trailed down the highways. This is accomplished by either manually or hydraulically folding the preloader 26 at its gooseneck 28 upon the mainframe 32, and also telescoping inwards the telescoping end 36 of the apparatus 10. Upon such folding over of the preloader 26, the end 40 of the trailer 16 can be seen and may include those requisite items that allow for legal transport. The elbow 22 of the trailer is now bent to allow connection of the hitch 18 with a truck or cab.

Figure 3:
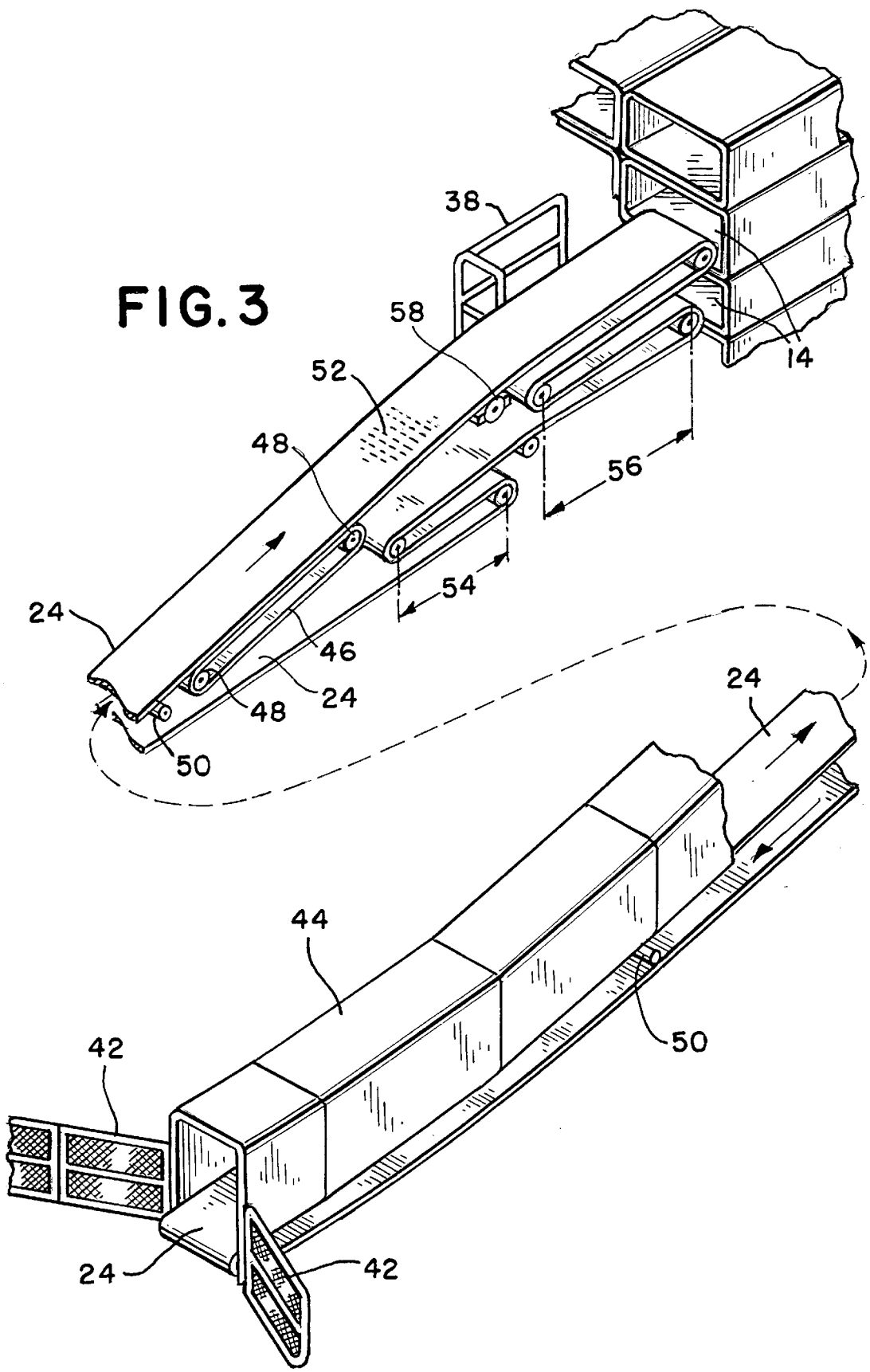
FIG. 3 is a reverse perspective view of FIG. 1 depicting the conveying means of the apparatus.

FIG. 3 is illustrative of the conveying means of the preferred embodiment. The poultry first need to be coaxed onto the conveyor belt 24 at the front end of the preloader 26. This is accomplished through the placement of temporary corral fences 42 about the area in which the poultry will be loaded from. The only exit for the poultry will be through the preloader 26 and on to the conveyor belt 24. This can be done by any unskilled hand through any conventional coaxing method. The preloader 26 is shown in FIG. 3 with a removable cover 44 that may extend all the way to the designated coop 14. The tunnel resulting beneath the cover may have a forced air draft of variable volume to keep the poultry cool in hot weather. The tunnel also provides a dark environment which results in a calming effect on the poultry.

The main conveyor belt 24 is powered by a hydraulic motor-driven booster belt 46 in the preferred embodiment. The booster belt 46 transfers its energy to the main belt 24 via surface contact. Booster belt rollers 48 are located within the mainframe 32. Similarly, numerous main belt rollers 50 are utilized throughout the entire track of the main belts 24 travel. The booster belt 46 is preferred to power the main conveyor belt 24 because a low tension is needed due to wear on the belt 24 as it is constantly run over the small rollers 50. In the preferred embodiment, the main belt carrying surface is equipped with miniature cleats 52 to aid in traction.

In order to address different height and length tiers during loading, the poultry loading/unloading apparatus 10 of the present design is adjustable both at its mainframe 32 and at its telescoping end 36. To maintain the main belt 24 at a constant tension and a constant length during these adjustments, the poultry loading apparatus 10 utilizes a pair of belt pulleys that "make up" the space that results from either an increased belt length during adjustment to a higher tier coop or a decreased belt length when lowering. The preferred embodiment includes two such belt pulleys. One set is the mainframe belt pulleys 54 which are mounted on a single frame allowing the operator to make up the space that results when each higher tier is addressed on the coop transport vehicle. The other set is the telescoping belt pulleys 56 which are mounted on a single frame which telescopes into the poultry coop. The telescoping belt pulleys 56 also make up any difference in main belt tension or length when the telescoping portion needs to pivot upon the telescoping pivot point 58.

Figure 4:
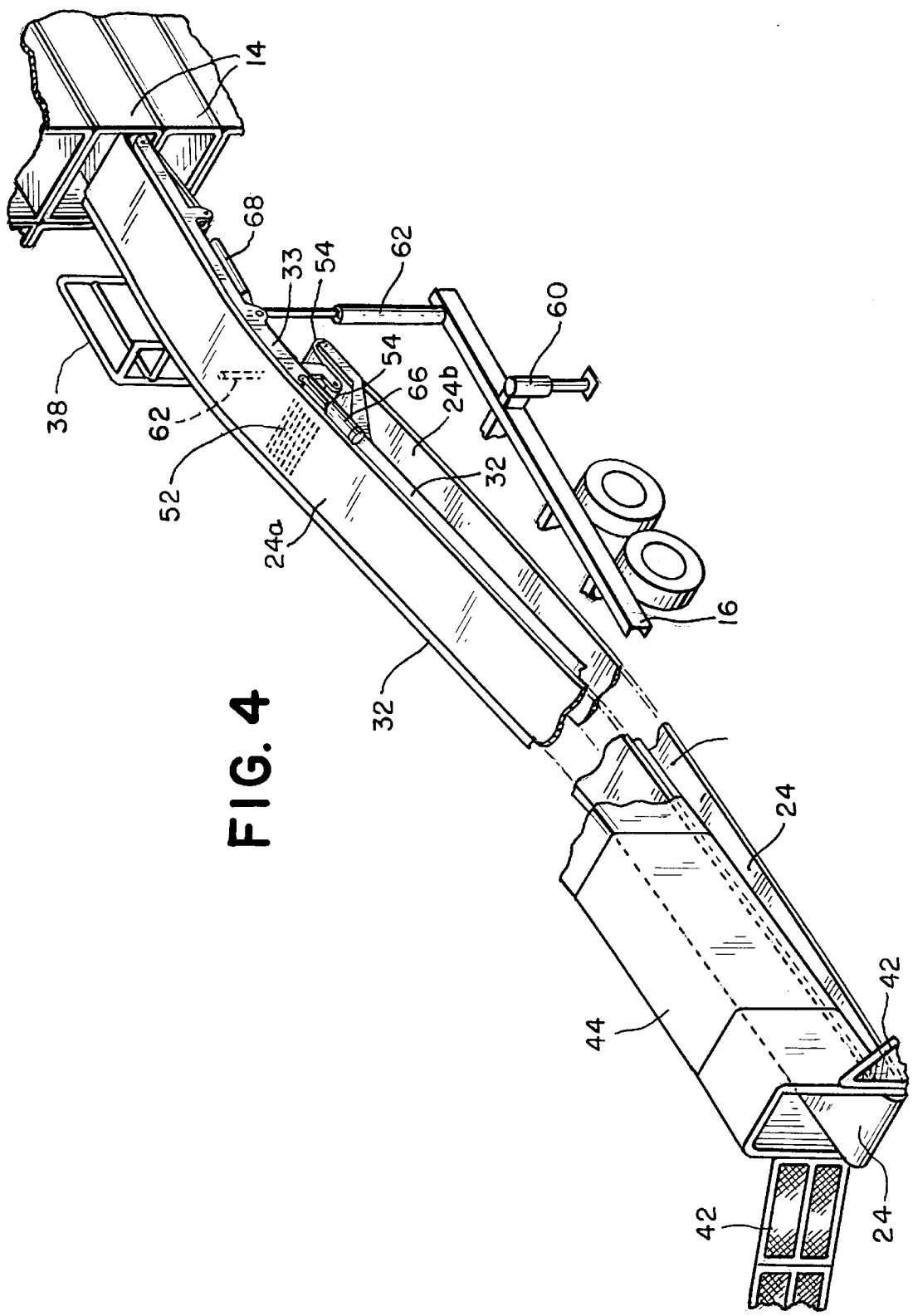
FIG. 4 is a reverse perspective view of FIG. 1 further depicting the hydraulic means of the apparatus.

FIG. 4 is illustrative of the methods of controlling the poultry loading apparatus 10. The preferred embodiment controls all of its functions via hydraulic air flow and consequently the speeds of all functions can be varied. When the apparatus is initially positioned between the transport vehicle and the confinement area, a pair of twin hydraulic cylinders called outriggers 60, which are attached to the trailer 16 are adjusted to level the apparatus transversely. Another pair of hydraulic cylinders 62 adjust the operating angle of the apparatus. From the parked angular position of 4°, the operating angle can be adjusted to a preferred angle of 50° through 18°, although angles greater than 18° may be achieved.

Figure 5:
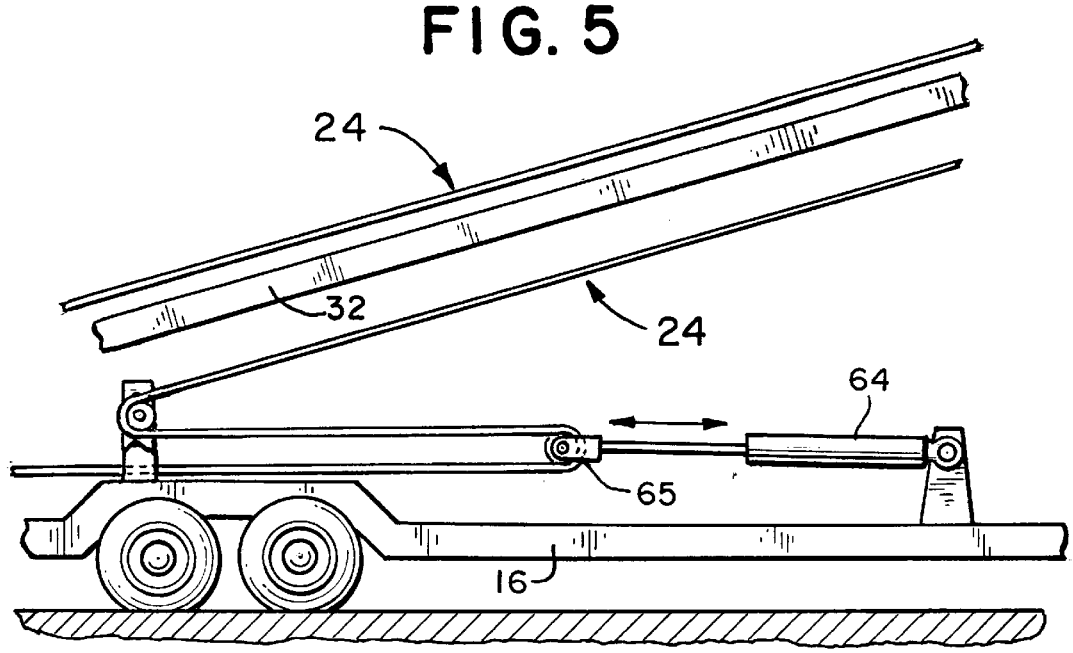
FIG. 5 is a profile view of FIG. 4 focusing on the main tension control hydraulic cylinder.

FIG. 5 depicts a more detailed illustration of the function of the hydraulic cylinder 64 and pulley 65 as they maintain a preset tension on the main conveyor belt, 24 thereby automatically adjusting the belt length as an auxiliary function. This cylinder 64 along with pulley 65 are also used to release tension and acquire slack in the main belt 24 when preparing to pull out or pull in the three piece preloader 26 when setting up or preparing to transport to another location.

Figure 6:
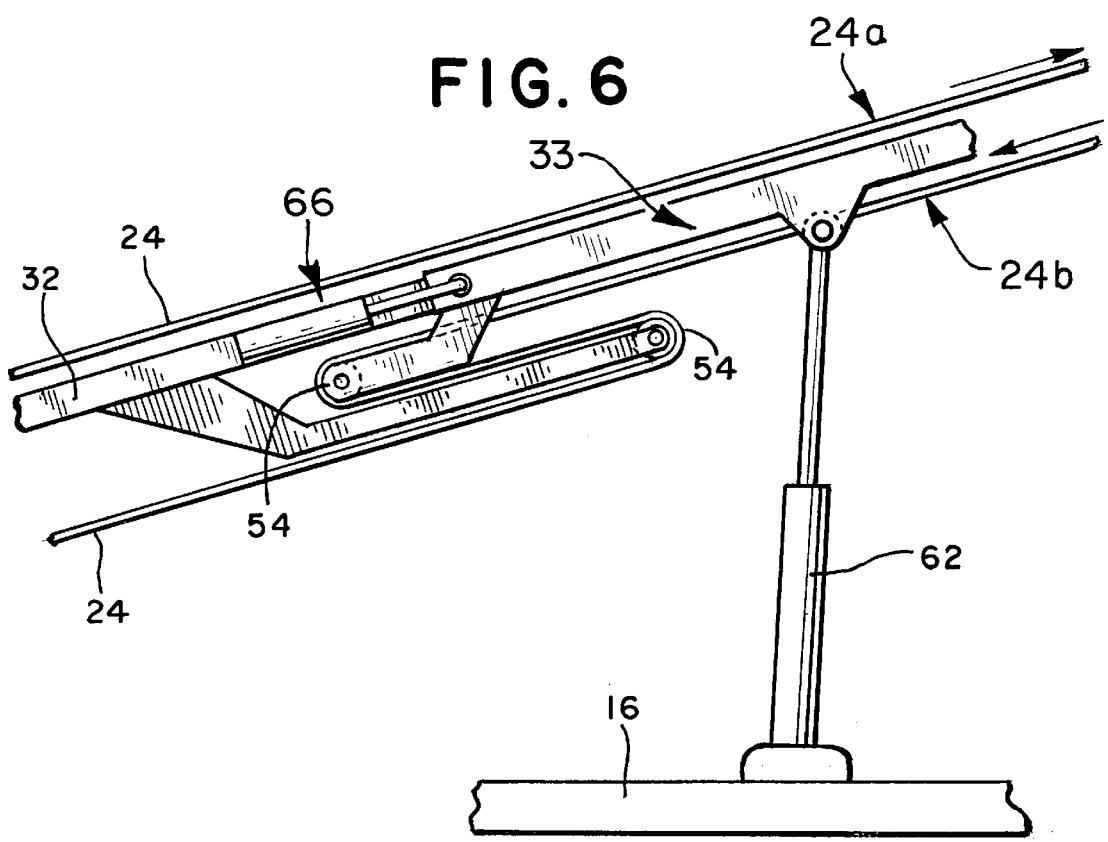
FIG. 6 is a profile view of FIG. 4 focusing on the mainframe tension control hydraulic cylinders.

The two pair of belt pulleys 54, 56 discussed previously are also controlled by hydraulic cylinders. As shown in FIG. 6, a pair of hydraulic cylinders 66 are positioned on either side of the conveyor belt on the top portion of the mainframe 32 relative the mainframe belt pulleys 54. These belt pulleys 54 automatically move toward each other shortening the return belt 24b by an amount equal to the lengthening of the carrying belt 24a when the operator extends the hydraulic cylinder 66 telescoping the fly frame 33 inward. The telescoping function of these elements enable the operator to adjust the length of the carrying belt 24a as needed when the pair of near vertical hydraulic cylinders 62 move the mainframe upward and downward to address the different tiers of poultry coops 14 on the transport vehicle.

Figure 7:
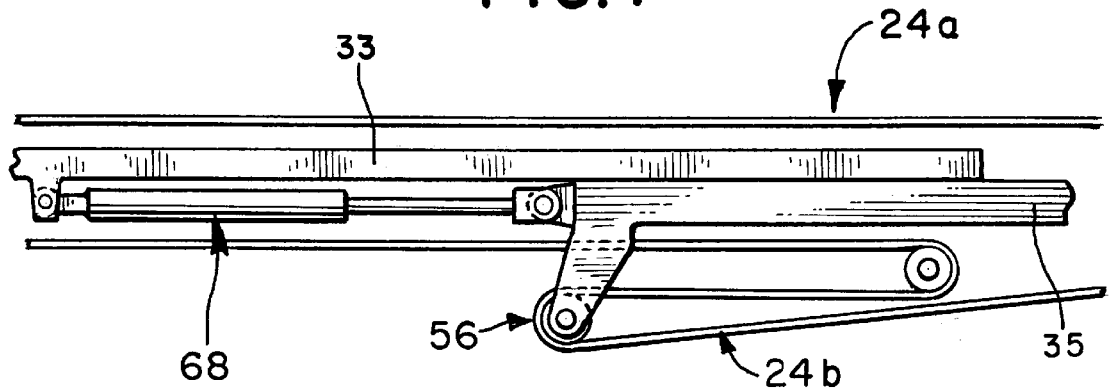
FIG. 7 is a profile view of FIG. 4 focusing on the telescoping end control hydraulic cylinders.

Similarly, as shown in FIG. 7 a pair of hydraulic cylinders 68 are positioned about the telescoping end of the apparatus relative the telescoping end belt pulleys 56. These twin cylinders allow the pulleys 56 to automatically move toward each other shortening the return belt 24b by on amount equal to the lengthening of the carrying belt 24a when the operator extends the hydraulic cylinder 68 telescoping the final telescope 35 outward. Alternately, pulleys 56 move away from each other when the operator shortens the hydraulic cylinder 68 telescoping the final telescope 35 inward.

Figure 8:
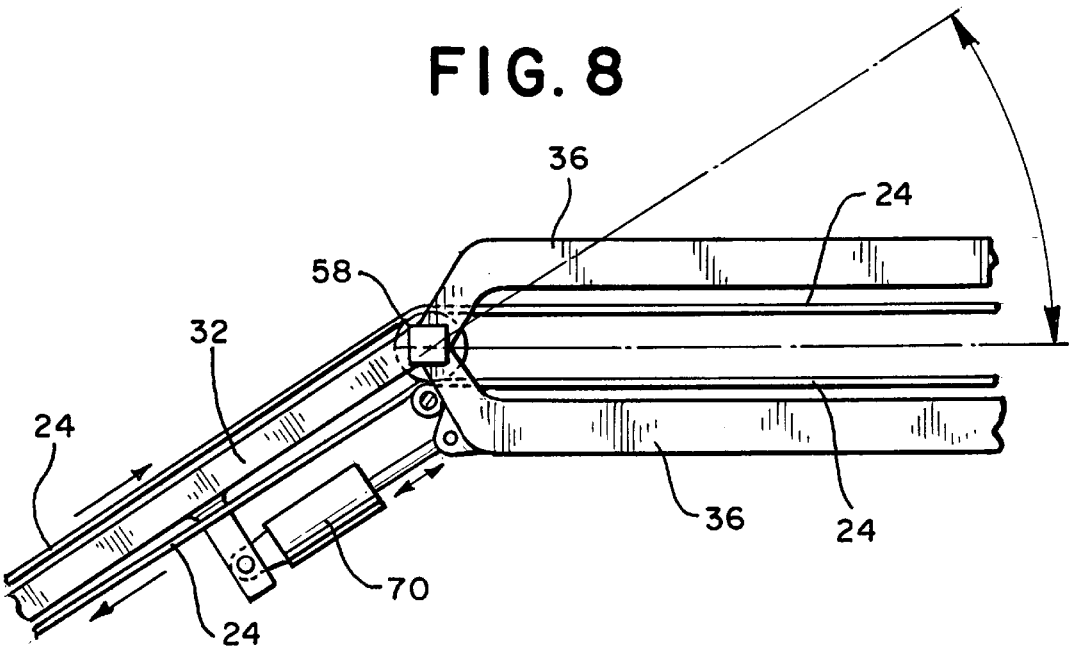
FIG. 8 is a profile view of FIG. 4 focusing on the pivoting action of telescoping end pivoting cylinders.

Additionally, FIG. 8 shows another pair of hydraulic cylinders 70 which allow the operator to pivot the telescoping portion about the telescoping pivot point 58 to ensure a level entry by the telescoping portion into the designated coop 14.

In operation, the poultry loading apparatus 10 is positioned in between the poultry confinement area and a transport vehicle loading point. The outriggers 60 are used to level the apparatus transversely and the towing vehicle is released and removed. The preloader 26 is then unfolded or telescoped at its gooseneck 28 into the horizontal position. The protective sides 34 of the mainframe 32 are unfolded and/or the removable cover 44 is attached to the apparatus. An operator then mounts the operator platform 38, and the transport vehicle 12 is positioned (as in FIG. 1).

Before loading, the operator makes certain that when the final telescope 35 is extended into a coop 14, it is parallel to and nearly touching the coop floor. This is accomplished by manipulating the controls of the hydraulic cylinders 68 and 70 upon the operators platform 38.

The poultry can now be coaxed onto the conveyor belt 24 at the preloader 26. As the designated coop 14 fills with poultry, the final telescope 35 is retracted. Belt speed as well as the telescoping speeds are controllable via the operators platform 38. When the coop is full, the belt 24 is stopped and the apparatus 10 is raised to the next level via hydraulic cylinders 64. When a row of coops are full, the transport vehicle 12 is moved perpendicularly relative to the apparatus 10 so that the next adjacent row can be loaded.

When loading is complete at a site, the present embodiment includes a washdown system (not shown) which is used to clean and disinfect the apparatus before moving to another farm. The system includes a reservoir tank where water and disinfectants are mixed, and a pump and sprayer that enable the operator to adequately clean and disinfect the entire apparatus.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A poultry loading/unloading apparatus, comprising:

a base having a first and a second end;

a mainframe having a first and a second section, both of said sections having a first and a second end, said first end of said first section pivotably attached near said first end of said base, said first end of said second section pivotably attached to said second end of said first section;

a means to pivot said sections relative to one another;

a means for raising/lowering said mainframe in the vertical plane relative to said base by raising/lowering said mainframe at a point near the attachment of said sections;

said first section includes a first means to keep a constant length and tension on said conveying means when said sections are pivoted relative to one another;

said first section includes a second means to keep a constant length and tension on said conveying means when said mainframe is raised and lowered; and said second section includes a means for extending/retracting said second end of said second section, said means for extending/retracting further keeping a constant length and tension on said conveying means.

2. A poultry loading/unloading apparatus as defined in claim 1 wherein said base further includes a set of wheels and a hitch.

3. A poultry loading/unloading apparatus as defined in claim 1 wherein said means to pivot are hydraulic cylinders.

4. A poultry loading/unloading apparatus as defined in claim 1 wherein said first and second means to keep a constant length and tension on said conveying means are hydraulic cylinders and pulleys.

5. A poultry loading/unloading apparatus as defined in claim 1 wherein said means for extending/retracting includes a system of hydraulic cylinders and pulleys.

6. A poultry loading/unloading apparatus as defined in claim 1 wherein said conveying means includes a single conveyor belt.

7. A poultry loading/unloading apparatus as defined in claim 1 further including a preloader having a first and a second end, said second end of said preloader pivotably attached near said first end of said base, said preloader including a means to pivot said preloader about said base, said conveying means extending from said first end of said first section to said first end of said preloader.

8. A poultry loading/unloading apparatus as defined in claim 7 wherein said preloader further includes a removable cover.

9. A poultry loading/unloading apparatus as defined in claim 1 wherein said mainframe further includes sidewalls.

10. A poultry loading/unloading apparatus as defined in claim 9 wherein said mainframe further includes a cover.

11. A poultry loading/unloading apparatus as defined in claim 1 wherein said second section further includes an operator platform on either side thereof.

12. A poultry loading/unloading apparatus as defined in claim 1 wherein said conveying means is powered by a hydraulic-driven booster belt.

13. A poultry loading/unloading apparatus as defined in claim 1 wherein said first section and said base comprise an operating position of said apparatus at a preferred angle of less than 25 degrees to eliminate rolling back of poultry.

14. A poultry loading/unloading apparatus as defined in claim 1 wherein said base further includes a pair of outriggers for the leveling of the apparatus transversely.

15. A poultry loading/unloading apparatus as defined in claim 1 wherein said apparatus further includes a washdown system.

* * * * *

UNITED STATES PATENT AND TRADEMARK OFFICE
CERTIFICATE OF CORRECTION

PATENT NO. : 5,902,089
DATED : May 11, 1999
INVENTOR(S) : Steven C. Sinn et al.

It is certified that error appears in the above-indentified patent and that said Letters Patent is hereby corrected as shown below:

On the Title page, item [76] Inventors; "James D. Wilham" should be replaced with --James Pyle--.

Signed and Sealed this

Nineteenth Day of October, 1999

Attest:

Q. TODD DICKINSON

Attesting Officer     Acting Commissioner of Patents and Trademarks